United States Patent [19]
Jorgenson et al.

[11] Patent Number: 5,856,369
[45] Date of Patent: Jan. 5, 1999

[54] POLYETHERS AND POLYSILOXANE COPOLYMERS MANUFACTURED WITH DOUBLE METAL CYANIDE CATALYSTS

[75] Inventors: Michael W. Jorgenson, Quincy, Ill.; Richard Budnik, Mount Kisco, N.Y.; Glenn A. Miller, Charleston, W. Va.

[73] Assignee: OSi Specialties, Inc., Greenwich, Conn.

[21] Appl. No.: 902,017

[22] Filed: Jul. 29, 1997

Related U.S. Application Data

[60] Provisional application No. 60/022,795, Jul. 30, 1996.

[51] Int. Cl.$^6$ .................................................... C08G 77/60
[52] U.S. Cl. ............................................. 521/112; 528/28
[58] Field of Search ............................................. 521/112

[56] References Cited

U.S. PATENT DOCUMENTS

| | | |
|---|---|---|
| 3,427,256 | 2/1969 | Milgrom . |
| 3,427,334 | 2/1969 | Belner . |
| 3,427,335 | 2/1969 | Herold . |
| 3,829,505 | 8/1974 | Herold . |
| 3,879,433 | 4/1975 | Omietanski et al. . |
| 3,957,843 | 5/1976 | Bennett . |
| 4,025,456 | 5/1977 | Litteral et al. . |
| 4,242,490 | 12/1980 | Emerson et al. . |
| 4,472,560 | 9/1984 | Kuyper et al. . |
| 4,477,589 | 10/1984 | van der Hulst et al. . |
| 4,857,583 | 8/1989 | Austin et al. . |
| 5,145,879 | 9/1992 | Budnik et al. . |
| 5,191,103 | 3/1993 | Mehta et al. . |
| 5,321,051 | 6/1994 | Burkhart et al. . |
| 5,359,113 | 10/1994 | Bank . |

FOREIGN PATENT DOCUMENTS

| | | |
|---|---|---|
| 0 573 864 A2 | 5/1993 | European Pat. Off. . |
| 712884A2 | 5/1996 | European Pat. Off. . |
| 05-117352 | 5/1993 | Japan . |

*Primary Examiner*—Morton Foelak
*Attorney, Agent, or Firm*—Edward K. Welch, II; Andrew S. Reiskind; Timothy X. Witkowski

[57] ABSTRACT

The invention discloses a new class of silicone surfactants and their use for the preparation of flexible urethane foam. The surfactants incorporate high molecular weight polyethers prepared with narrower molecular weight distributions than conventional polyethers. These polyethers are prepared using a double metal cyanide (DMC) catalyst. These surfactants are better foam stabilizers than the analogous surfactants prepared from conventional polyethers.

16 Claims, No Drawings

POLYETHERS AND POLYSILOXANE COPOLYMERS MANUFACTURED WITH DOUBLE METAL CYANIDE CATALYSTS

This application claims priority from U.S. Provisional Application No. 60/022,795, filed Jul. 30, 1996.

BACKGROUND OF THE INVENTION

In polyurethane foam manufacturing, surfactants are needed to stabilize the foam until the product-forming chemical reactions are sufficiently complete so that the foam supports itself and does not suffer objectionable collapse. On account of the complex interplay of these physico-chemical and rheological phenomena, it is not readily possible to predict the effect of subtle compositional changes on the overall performance of a surfactant even for those skilled in the art.

High potency silicone surfactants, generally understood to be those which give a high height of rise and little top collapse at minimal use levels, are desirable because foams which collapse to a substantial degree before setting have high densities and objectionable density gradients. In general, it is preferred that the surfactant produces high rise, little or no top collapse, and high airflow performance. The latter feature refers to the ability of air to pass through the foam and is also referred to as foam breathability.

Silicone surfactants for polyurethane foam manufacture typically are materials having siloxane backbones and polyether pendant groups. For example, U.S. Pat. No. 4,147,847 describes certain polysiloxane-polyoxyalkylene copolymer ("Copolymer") surfactants having mixed alkylene oxide feed polyethers with molecular weights up to approximately 5500. U.S. Pat. No. 4,025,456 teaches that a key to excellent performance is using a blend of polyethers with a distribution of molecular weights where a significant part of high molecular weight polyether is preferred.

With regard to such teachings, unfortunately, conventional alkylene oxide polymerization catalysts such as KOH cannot produce high quality polyethers with molecular weights above 5000 if more than about 20% propylene oxide (PO) is present in the alkylene oxide feed. Since the prior art teaches the need for the use of PO (or higher alkylene oxides) in the polyethers, this is a serious limitation. With conventional catalysts such as KOH, small amounts of PO continuously rearrange to give allyl alcohol which functions as a new source of unsaturated starter in competition with the original starter. Eventually conditions are established where further PO addition fails to increase the overall molecular weight of the polyether product. In other words, in attempting to increase the molecular weight, more low molecular weight species are generated which compete with the existing oligomers for chain growth and the overall number average molecular weight of the polyether product does not increase. With KOH catalysis, for example, the overall number average molecular weight levels off around 5000 daltons for these mixed polyethers.

Moreover, due to the reactivity of KOH, the polyethers produced thereby do not have a random distribution of alkylene oxide units when a mixed feed is used. Instead, when a polyether is prepared from a blended feed of ethylene oxide (EO) and propylene oxide (PO), the distal portions of the polyether (from the starter) are rich in PO as compared to the proximal end thereof. Said lack of even distribution affects polyether performance.

When analyzed by size exclusion chromatography, high molecular weight, i.e., >5000 MWt, polyethers made with substantial amounts of PO and KOH catalysis exhibit a broad distribution of molecular weights (generally having a polydispersity of greater than 1.4) and contain a substantial amount of low molecular weight polyether contaminant. These low molecular weight contaminants compete with the high molecular weight polyethers during synthesis of the silicone surfactants and effectively reduce the number of high molecular weight pendants bound to the silicone backbone. Only the lower MWt polyethers (i.e., <5000 MWt) typically have a polydispersity <1.5. Since the art teaches that high molecular weight pendants are important for potency, a substantial content of lower molecular weight polyethers are not contributing to good performance and therefore are undesirable.

Double metal cyanide (DMC) catalysts have been used in silicone surfactant preparation as reported in Japanese Kokai 05-117,352 which discloses the DMC synthesis of allylpoly(PO) polyethers of conventional molecular weights and subsequent addition of ethylene oxide (EO) moieties to these products using conventional KOH technology (final molecular weights less than 3000 daltons). Accordingly, the polyethers disclosed therein have a blocked, non-random distribution of EO and PO units. Moreover, this process necessitates the extra step of removing the KOH prior to the subsequent hydrosilation reaction because residual KOH reacts preferentially with hydridosiloxane (SiH) functional groups and reduces the efficiency of polyether grafting to the siloxane backbone during hydrosilation and produces hydrogen gas, a process hazard.

European Patent Application 0,573,864 A2 discloses the use of DMC catalysts for the addition of epoxides (PO and allyl glycidyl ether) to non-hydrolyzable siloxane-polyether copolymers having uncapped hydroxyl groups. Thus, the epoxides were added directly to the polysiloxane, rather than forming a polyether separately as is standard in the art. Such a synthesis provides no ability to achieve a surfactant where the pendant polyethers have varied molecular weights or compositions.

SUMMARY OF THE INVENTION

The present invention provides nonhydrolyzable Copolymer surfactants that offer good potency and which have the generalized average formula $M"D_xD"_yM"$ wherein M" represents $(CH_3)_3SiO_{1/2}$ or $R(CH_3)_2SiO_{1/2}$;

D represents $(CH_3)_2SiO_{2/2}$;

D" represents $(CH_3)(R)SiO_{2/2}$;

x is from about 40 to about 220; and y is from about 5 to about 34;

R are polyether-containing substituents obtained from a blend of at least two different polyethers selected from the following two groups:

1) $—C_{n'}H_{2n'}O(C_2H_4O)_{a'}(C_3H_6O)_{b'}R"$ moieties having average molecular masses above 3000 wherein the distribution of $—C_2H_4O—$ ("EO") and $—C_3H_6O—$ ("PO") groups is random wherein n' is 3–4;

a' and b' are positive numbers such that $0 \leq a'/(a'+b') \leq 0.6$;

R" represents —H, an alkyl group of 1–8 carbon atoms, —C(O)R''', —C(O)OR''' or —C(O)NHR''';

R"" represents a mono-functional alkyl or aryl group;

the random block of EO/PO of said polyether having been produced using a double metal cyanide catalyst; and 2) $—C_{n"}H_{2n"}O(C_2H_4O)_{a"}(C_3H_6O)_{b"}R"$ moieties having average molecular masses in the range 300–4000 wherein n" is 3–4;

a" and b" are independently 0 or a positive number such that the total molecular weight of the polyether is between 300 and 3000;

and the R" and R'" moieties are as defined above; wherein the blend average molecular weight of the polyethers is between 1100–3000 and wherein there may be more than one polyether from either group, but at least one from the first group.

Moreover, the present invention teaches polyethers, and the making thereof, suitable for use in said surfactants.

DETAILED DESCRIPTION OF THE INVENTION

Advantages

The use of very high molecular weight polyethers of good purity, i.e., allyl-terminated polyethers with a narrow molecular weight distribution, prepared with DMC catalysts to produce Copolymer surfactants with superior performance is a major advantage of the present invention. In particular, polyethers produced with DMC using allyl or methallyl alcohol-based starters and/or with substantial amounts of PO in the alkylene oxide feed will contain less propenyl-terminated polyether contaminants than would be found with the standard processes. Since the propenyl-terminated polyethers are unreactive in the copolymer synthesis, they are undesirable and wasteful. Use of DMC-produced polyethers results in more efficient use of raw materials when these polyethers are used to produce copolymers. Additionally, the resulting polyethers are much more uniform (i.e., narrow) in molecular weight distribution, having polydispersities of 1.1 to 1.4 at molecular weights above 5000, which again avoids wasteful low molecular weight polyethers.

Another advantage of the invention is elimination of the polyether purification step in which the alkoxylation catalyst must be removed from the crude polyether product. A further advantage is that the siloxane-polyether copolymers have high molecular weight polyethers with narrower molecular weight distributions than can be achieved using conventional KOH process polyethers. Yet another advantage is the provision of very high potency surfactants for the stabilization of flexible polyurethane foams. Since the present invention allows employing lower surfactant use levels and the Copolymer product has a lower silicone content, this results in a substantial economic benefit.

Structure

The preferred Copolymer for use herein has the general average formula M"$D_xD"_yM"$ with x=40–145, y=5.0–23, and D:(D"+M")<10:1. A second preferred material within this class has the general average formula M"$D_xD"_yM"$ with x=65–135, y=7–22, and D:(D"+M")<10:1.

Blend average molecular weight (BAMW) is the weighted number average molecular weight of the mixture of terminally unsaturated polyethers, the weighting taking account of the relative amounts of materials in the mixture. The BAMW of a two polyether surfactant is preferably 1100–2400 daltons. In the case that more than two polyethers are used, the overall BAMW of all the polyethers will be in the range 1900–3000 daltons and the molar ratio of the first and second group of polyethers should be between 0.8 and 2.5.

The first group of polyether pendants are prepared via DMC catalysis using a monofunctional alcohol as starter, and therefore there is a random distribution of EO and PO units within said polyether. Monofunctional alcohol starters either contain only one hydrosilatable group (such as a vinyl, allyl, methallyl, or alkyne moiety) or are monols which will be subsequently capped with a group containing a hydrosilatable group (e.g., capping butanol-started polyethers with an allyl group). Examples of hydrosilatable moieties in polyethers are well known in the art (examples include: U.S. Pat. Nos. 3,879,433, 3,957,843, 5,191,103, and 5,359,113). By random distribution it is meant that there Is not a block of EO followed by a block of PO within the polyether, nor any sections of the polyether particularly rich in EO or PO (unless present in the starter or capping group). Rather, the two different types of oxides are interspersed amongst each other essentially randomly in the polyether. It should be noted that higher alkylene oxides such as butylene oxide can also be used in addition to or in place of PO with the DMC catalyst.

Within the first group of polyether pendants there is a preferred sub-group that is composed of approximately 40% by weight of EO residues. It is preferred that such polyethers have BAMW greater than 4000 daltons, more preferably above 5000 daltons and most preferably above 6000 daltons. Additionally, R" is preferably —C(O)CH$_3$, —CH$_3$, or -(t-butyl). Some suitable R'" groups are methyl, ethyl, propyl, benzyl and phenyl.

Within the second group of polyethers there is a preferred sub-group that contains ≦20 % by weight PO and has an average molecular mass in the range 300–750 daltons. A more preferred polyether from this group is composed of approximately 100% by weight of EO and has a BAMW of 400–600 daltons. In these low molecular mass materials, R" is preferably —C(O)CH$_3$, —CH$_3$, or -(t-butyl). These high EO, low molecular weight polyethers are conveniently produced via conventional processes such as with KOH or BF$_3$-etherate catalysts.

Method of Manufacture

Procedures for synthesizing nonhydrolyzable Copolymers are well known. Typically, the surfactants are prepared by causing a polyhydridosiloxane of generalized average formulae MD$_x$D'$_y$M and/or M'D$_x$D'$_y$M' to react with an appropriately chosen blend of allyl terminated polyethers In the presence of a hydrosilation catalyst, such as hexachloroplatinic acid. In the formulae for the polyhydridosiloxanes, M and D are as above, M' is (CH$_3$)$_2$(H)SiO$_{1/2}$, and D' represents (CH$_3$)(H)SiO$_{2/2}$. The allyl terminated polyethers are polyether polymers having a terminal unsaturated hydrocarbon capable of undergoing hydrosilation (such as an allyl alcohol), which may optionally be 2-substituted (such as methallyl alcohol), and containing multiple units of alkylene oxides (i.e., EO or PO). The reagents are mixed, optionally in a solvent such as toluene, saturated polyethers, or dipropylene glycol, heated to about 75°–95° C., then the hydrosilation catalyst is added. If a volatile solvent was used, this is removed under vacuum, and the mixture (if acidic) may be optionally neutralized with a weak base such as NaHCO$_3$ or a trialkylamine.

To generate polyethers with greater than 60% by weight EO in the second group, conventional processes should be used because the DMC catalyst is too active for high EO feed and will preferentially generate polyethylene glycols. In such a process terminally unsaturated alcohol, optionally bearing a substituent on the 2-position, is combined with EO, PO, or both, in the presence of a Lewis acid or a base, to yield the desired polyether with a terminal hydroxyl group. The epoxides may be blocked or randomly distributed along the polyether chain.

The resulting polyethers are typically capped by further reaction (optionally in the presence of a catalyst) with an alkylating or acylating agent such as a methyl halide, allyl chloride (in the case of saturated monol starters such as n-butanol), isobutylene, acetic anhydride, phenyl isocyanate or alkyl carbonates, using procedures well known in the art.

In distinction, the first group of polyethers are manufactured using double metal cyanide (DMC) catalysts described in U.S. Pat. Nos. 3,427,256, 3,427,334, 3,427,335, 3,829,505, 4,242,490, 4,472,560, and 4,477,589 (all of which are incorporated herein by reference) which do not promote the PO-to-allyl alcohol rearrangement. Examples of such include: $Zn[Fe(CN)_5NO]$, $Ni_3[Mn(CN)_5CNS]_2$, $Cr[Fe(CN)_5NCS]$, and $Fe[Fe(CN)_5OH]$. Of particular utility is the zinc hexacyanocobaltate catalyst: $Zn_3[Co(CN)_6]_2$-x'$ZnCl_2$- y' (alcohol)- z'$H_2O$ wherein the alcohol is typically glyme (ethylene glycol dimethyl ether) or t-butanol, and the values of x', y', and z' depend on the exact method of preparation. The DMC catalysts can give essentially unlimited molecular weight polyethers with nearly the same number of equivalents of polyether as equivalents of the unit used as the starter for the polymerization.

A second advantage of the DMC catalyst is that it does not promote allyl-to-propenyl rearrangement in allyl alcohol starter (the most preferred starter) as does KOH. DMC catalysis can, therefore, produce polyethers with molecular weights equal to, or much greater than, those that can be produced with KOH technology but without impurities. PO/EO blends containing up to 60% by weight EO are successfully copolymerized with DMC catalysis as a mixed feed in a single step and the monomers are added at a known feed ratio so as to produce polyethers in which the monomer units are distributed in a random fashion at the same ratio as the monomer feed. With KOH catalysis and mixed EO/PO feeds, EO tends to react more quickly resulting in polyether chains that are EO-rich proximal to the monol starter and PO-rich distally. Thus polyethers produced by DMC catalysis have a different monomer distribution from conventional polyethers.

With mixed alkylene oxide feed to DMC catalyst, it is important to initiate ("activate") the catalyst with pure PO with at least two to four weight percent of the total PO to be fed to the reaction. Preferably this is done after mixing the catalyst and the starter alcohol. Once the catalyst has been initiated, the desired mixed feed of EO and PO can be started (up to 60% EO by weight). This results in a negligibly short PO block at the beginning (about 4 PO units) with the remaining material composed of randomly distributed EO and PO units. A continuous process could be accomplished by having a separate all-PO feed upstream to activate the catalyst and then mixed feed downstream where there is active catalyst after initiation. The reaction usually is run until the EO and PO are consumed. In the case of allyl alcohol starter, the polyethers, which are hydroxy end-capped, may then be capped with units such as methyl, acetoxy or t-butyl. Alternatively, a saturated monol such as n-butanol may be used as starter and the polyether capped with an unsaturated unit, such as allyl or methallyl.

It is important to use high quality raw materials free of contaminants (such as KOH or acetic anhydride) that may poison or otherwise interfere with the stability, activity, and selectivity of the hydrosilation catalyst. However, DMC is nonreactive and does not need to be removed. Treatment of the crude polyethers with a neutralizing agent to remove KOH and in vacuo stripping after acetoxy capping are examples of routine processing steps to ensure that polyethers will be of acceptable hydrosilation reactivity.

It has been found that some of the compositions of this invention have relatively high viscosities and are preferably dissolved in a lower viscosity vehicle prior to foam performance evaluations to achieve good and reproducible results. It is preferred to dilute the surfactant to about a viscosity of less than 2,000 centistokes at 25° C. Typical diluents include saturated, polar, high boiling point polyols or polyethers.

Use

The surfactants of the invention are employed in the manufacture of polyurethane foam in the manner known to the art which are generally made by reacting a mixture of (a) a polyether or polyester polyol containing an average of more than two hydroxyl groups per molecule; (b) an organic isocyanate having at least two isocyanate groups per molecule; (c) at least one catalyst; (d) optionally, an auxiliary blowing agent such as methylene chloride; (e) water; and (f) a siloxane-oxyalkylene copolymer surfactant as defined herein above.

The relative amounts of the various components of the foam formulation are not narrowly critical. The polyether or polyester polyol and isocyanate are present in a major amount and the relative amount of these two components is well known to the art. The blowing agent, catalyst, and surfactant are each present in a minor amount sufficient to foam the reaction mixture. The catalyst is present in a catalytic amount, i.e., that amount necessary to catalyze the reactions to produce the urethane at a reasonable rate, and the surfactant is present in an effective amount sufficient to stabilize the foam and achieve the properties desired, typically about 0.1 to 8 parts per hundred parts polyol (pphp), preferably 0.3 to 3 pphp.

The polyols which can be utilized in the present invention include, but are not limited to, the following polyether polyols: (a) alkylene oxide adducts of polyhydroxyalkanes; (b) alkylene oxide adducts of non-reducing sugars and sugar derivatives; (c) alkylene oxide adducts of polyphenols; and (d) alkylene oxide adducts of polyamines and polyhydroxyamines. Alkylene oxides having two to four carbon atoms generally are employed, with propylene oxide, ethylene oxide and mixtures thereof being particularly preferred.

Any material having active hydrogens, as determined by the Zerewitinoff method, may be utilized to some extent and therefore is included within the broad definition of the polyols. For example, amine-terminated polyether polyols, hydroxyl-terminated polybutadiene polyols and many others are known and may be used as a minor component in combination with the above-identified conventional polyether polyols.

Generally, the polyol component should have an equivalent weight in the range of about 400 to about 1500 grams/equivalent and an ethylene oxide content of less than 20%. Preferably the equivalent weight is in the range of about 500 to about 1300 grams/equivalent, and most preferably between about 750 and 1250 grams/equivalent. The polyol or polyol blend should have an average hydroxy functionality of at least 2. The equivalent weight is determined from the measured hydroxyl number. The hydroxyl number is defined as the number of milligrams of potassium hydroxide required for the complete hydrolysis of the fully acetylated derivative prepared from one gram of polyol. The relationship between the hydroxyl number and equivalent weight is defined by the equation: OH=56,100/equivalent weight, where OH equals the hydroxyl number of the polyol. Thus, polyols have hydroxyl numbers preferably in the range of about 43 to about 110, and more preferably in the range of about 45 to about 75.

Preferably the polyols should include the poly (oxypropylene) and poly(oxyethylene-oxypropylene) triols.

Ethylene oxide, when used, can be incorporated in any fashion along the polymer chain. Stated another way, the ethylene oxide can be incorporated either in internal blocks, as terminal blocks, or may be randomly distributed along the polyol chain. However, the manner of incorporation and the ethylene oxide content of the polyol preferably is as noted above. Thus, ethylene oxide is used at a level below about 20% by weight, preferably below about 15% by weight, and is located primarily within the interior of the polyol chain. Thus, preferably the polyols are substantially secondary hydroxyls.

Preferably, a portion or all of the polyol component may be added in the form of a polyol polymer in which reactive monomers have been polymerized within a polyol to form a stable dispersion of the polymer solids within the polyol.

The amount of polyol used is determined by the amount of product to be produced. Such amounts may be readily determined by one skilled in the art.

Organic isocyanates useful in producing polyurethane foam in accordance with this invention are organic compounds that contain, on average, between about one and a half and about six isocyanate groups, and preferably about two isocyanate groups. Suitable organic polyisocyanates include the hydrocarbon diisocyanates, e.g., the alkylene diisocyanates and the aryl diisocyanates and more specifically, diphenylmethane diisocyanate and toluene diisocyanate ("TDI"). Preferred polyisocyanates are 2, 4 and 2, 6 toluene diisocyanates and their mixtures having a functionality of about 2, which are broadly referred to herein simply as TDI. The most preferred polyisocyanate is 80/20 TDI (i.e., a mixture of 80% 2,4-toluene diisocyanate and 20% 2,6-toluene diisocyanate).

The amount of isocyanate to be used is dependent upon the index of foam desired and the final properties of the foam to be formed. If the index is 100, then there is a stoichiometric equivalent of the amount of isocyanate needed to react with the polyol component and the other active hydrogen containing components in the system. While the present invention may be practiced in a wide range of indexes, e.g. 60–120, the preferred range of use is indexes between 80 and 115; and most preferably the range of indexes is 85–95.

Water is the preferred blowing agent, to produce carbon dioxide by reaction with isocyanate. Water should be used at about 1 to 12 pphp (parts per hundred of polyol) and preferably between 2 and 10 pphp. At foam indexes below 100, the stoichiometric excess of water cools and blows via vaporization, not as part of the reaction to produce carbon dioxide. Other blowing agents may be used herein, in addition to or even instead of water, such as carbon dioxide, methylene chloride, halocarbons of 1–3 carbon atoms, and other equivalent inert blowing agents.

The catalyst component is one or a combination of standard tertiary amine and organometallic polyurethane catalysts which should be present at about 0.0001 to 5 weight percent of the reaction mixture. Suitable catalysts include, but are not limited to, dialkyltin salts of carboxylic acid, tin salts of organic acids, triethylene diamine (TEDA), bis (2,2'-dimethylaminoethyl) ether and similar compounds that are well known to the art.

The relative amounts of the various components of the foam formulation are not narrowly critical. The polyether polyol and polyisocyanate are present in a major amount and the relative amount of these two components is well known to the art. The blowing agent, catalyst, and surfactant are each present in a minor amount sufficient to foam the reaction mixture. The catalyst is present in a catalytic amount, i.e., that amount necessary to catalyze the reactions to produce the rigid, flexible, rim, molded microcellular and high resiliency polyurethane foam at a reasonable rate, and the surfactant is present in an effective amount sufficient to stabilize the foam and achieve the properties desired, typically about 0.1 to 8 parts per hundred parts polyol (pphp), preferably 0.3 to 3 pphp.

EXAMPLES

In the examples that follow, all reactions involving the manipulation of organometallic compounds were performed in an inert atmosphere. Commercial reagents were used without additional purification. The following terms are employed herein as defined below.

The term "potency" refers to the ability of a surfactant to stabilize foam during its manufacture. High potency surfactants allow high heights of rise and only relatively small amounts of top collapse during foam manufacture. In general, higher rise and/or good rise at lower surfactant use levels are desirable.

The phrase "processing latitude" refers to the ability of a foam composition to tolerate changes in its ingredients or amounts thereof, while still producing product having the desired properties. This is often reflected by high (or flat) breathability performance at higher surfactant or catalyst use levels.

The terms "breathability" and "airflow" refer to the ability of a cured foam to permit passage of a gas. A "tight" foam has low breathability, while an "open" foam is said to have a high breathability and permits ready passage of gas through it.

Flat breathability refers to the property of a surfactant to function in foam compositions at low, customary, and high levels while still producing product foams having relatively constant breathabilities. Low use levels are typically between 0.7 and 1.0 pphp. Customary levels are 1–3 pphp and high levels are greater than 3 pphp. In general, high and flat breathability performance are preferred.

The compounds designated as L-620, DC-5160 and B-8021 are Copolymer surfactants available from Witco Corp., OrganoSilicones Group, Dow Corning Chemical Company of Midland, Ml and Th. Goldschmidt Company of Germany, respectively. L-620 and DC-5160 are non-hydrolyzable and B-8021 is hydrolyzable and alkoxy end-blocked.

Blowing agent U-11 is $CCl_3F$. ARCOL® polyol 16–56 is a commercial product of ARCO Company, Inc., and has CAS Reg. No. 9082-00-2. Toluene diisocyanate (TDI) was a mixture of approximately 80% of the 2,4- isomer and 20% of the 2,6- isomer, and was used in excess. NIAX® catalyst A-200 is commercially available from Witco Corp., OrganoSilicones Group, and is a mixture of tertiary amines and a glycol.

Preparation of High Molecular Weight Monols using a Double Metal Cyanide Catalyst Since allyl alcohol is very toxic, a propoxylated derivative such as APPG-200 (allyl alcohol capped with approximately 3 PO units, commercially available from Union Carbide Corp.) can also be used as the starter, especially in lab scale experiments where attention to the toxicity may be more critical. APPG-200 (8.9 g) and 12 mL heptane were charged to a 500 mL autoclave. Zinc hexacyanocobaltate/glyme complex (0.071 g) was added and the reactor flushed 3 times with nitrogen to remove air. The mixture was heated to 105° C., excess pressure was vented, PO (10 g) was charged, and the mixture stirred until a drop in pressure indicated catalyst activation. A blend of PO and EO (containing 204.6 g PO and 136.4 g EO) was fed into the reactor at a rate to maintain the pressure below 50 psig. The resulting polyether was subjected to a vacuum strip to remove any unreacted alkylene oxides. The product had a viscosity of 5700 cSt (@25° C.), hydroxyl number 7.8 mg KOH/g, and unsaturation 0.115 meq/g (approximate molecular weight 8000 daltons).

Preparation of $MD_xD''_yM$ Surfactants

A typical preparation proceeded as follows: A flask fitted with a mechanical stirrer, a reflux condenser, and a thermometer was charged under positive nitrogen pressure with the desired $MD_xD'_yM$ fluid, blend of polyethers, and solvent (if used). BHT (0.6 g, 0.1 w/w %) and, where indicated, buffer (sodium propionate) was added, the mixture was stirred and heated to 80° C., and an ethanol solution of hexachloroplatinic acid (25 ppm Pt) was added. An exotherm of 5°–15° C. ensued, after which the reaction was allowed to proceed for approximately 40 minutes. Any volatile solvents or by-products were removed under vacuum, and the resulting copolymer product was cooled to room temperature, and optionally neutralized with sodium bicarbonate or tertiary amines (if acidic). Table 1 gives exact raw material charges for each copolymer. Examples 1–3 employ polyethers with molecular weights similar to those used in prior art but prepared via DMC catalysis. This allows a direct comparison with conventional technology (designated as the Control in Table 4) which was prepared via the above procedure using conventional KOH-process polyethers.

TABLE 1

Specifics of Surfactant Syntheses.

| Copolymer Number | Polyether ID | Wt (g) | BAMW (a) | SiH Fluid (wt in g) | Comments |
|---|---|---|---|---|---|
| 1 | 40HA4000Ac | 27.0 | 1200 | MD100D'16.7M | High Viscosity |
|  | APEG550Ac | 18.5 |  | 15.0 |  |
| 2 | 40HA4000Ac | 47.0 | 1500 | MD65D'7.7M |  |
|  | APEG550Ac | 19.3 |  | 24.0 |  |
| 3 | 40HA4000Ac | 55.0 | 1800 | MD65D'7.7M | High Viscosity |
|  | APEG550Ac | 15.0 |  | 21.2 |  |
| 4 | 40HA8000Ac | 24.9 | 1200 | MD100D'16.7M |  |
|  | APEG550Ac | 20.6 |  | 15.0 |  |
| 5 | 40HA12,000Ac | 24.25 | 1200 | MD100D'16.7M |  |
|  | APEG550Ac | 21.3 |  | 15.0 |  |
| 6 | 40HA8000Ac | 33.8 | 1800 | MD65D'7.7M |  |
|  | APEG550Ac | 12.9 |  | 14.1 |  |
| 7 | 40HA8000Ac | 22.4 | 1200 | MD65D'7.7M |  |
|  | APEG550Ac | 18.5 |  | 18.5 |  |
| 8 | 40HA8000Ac | 28.9 | 1500 | MD85D'7.7M |  |
|  | APEG550Ac | 15.3 |  | 16.0 |  |
| 9 | 40HA8000tBu-Magn. | 26.3 | 1300 | MD100D'16.7M | 750 ppm NaPro added prior |
|  | APEG550tBu | 20.3 |  | 14.2 | to hydrosilation |
|  | Polyether Diluent | 12.2 |  |  |  |
| 10 | 40HA8000tBu | 26.3 | 1300 | MD100D'16.7M | 750 ppm NaPro added prior |
|  | APEG550tBu | 20.3 |  | 14.2 | to hydrosilation |
|  | Polyether Diluent | 12.2 |  |  |  |
| 11 | 40HA8000tBu | 24.4 | 1200 | MD100D'16.7M | 750 ppm NaPro added prior |
|  | APEG550tBu-Magn. | 21.1 |  | 15.0 | to hydrosilation |
|  | Polyether Diluent | 12.2 |  |  |  |
| 12 | 40HA8000tBu | 27.0 | 1300 | MD100D'16.7M | 750 ppm NaPro added prior |
|  | APEG550tBu-Magn. | 19.6 |  | 14.2 | to hydrosilation |
|  | Polyether Diluent | 12.2 |  |  |  |
| 13 | 40HA8000tBu | 26.3 | 1300 | MD100D'16.7M | No MAGNESOL Treatment. |
|  | APEG550tBu | 20.3 |  | 14.2 |  |
| 14 | 40HA8000tBu-Magn. | 17.35 | 1300 | MD100D'16.7M | Both polyethers subjected to |
|  | APEG550tBu-Magn. | 13.4 |  | 9.35 | MAGNESOL Treatment. |
| 15 | 40HA6000tBu | 27.0 | 1300 | MD100D'16.7M | No Magnesol Treatment. |
|  | APEG550tBu | 19.6 |  | 14.2 |  |
| 16 | 40HA6000tBu | 27.0 | 1300 | MD100D'16.7M | Low MWt polyether |
|  | APEG550tBu-Magn. | 15.5 |  | 14.2 | subjected to MAGNESOL |
|  | APEG550tBu | 4.1 |  |  | Treatment. |
| 17 | 40HA6000Ac | 51.1 | 1200 | MD100D'16.7M |  |
|  | APEG550Ac | 39.9 |  | 30.0 |  |
| 18 | 40HA10,000Ac | 49.0 | 1200 | MD100D'16.7M |  |
|  | APEG550Ac | 42.0 |  | 30.0 |  |
| 19 | 55HA6000Ac | 51.1 | 1200 | MD100D'16.7M |  |
|  | APEG550Ac | 39.9 |  | 30.0 |  |
| 20 | 55HA10,000Ac | 49.0 | 1200 | MD100D'16.7M |  |
|  | APEG550Ac | 42.0 |  | 30.0 |  |
| 21 | 40HA8000Ac | 41.1 | 1300 | MD100D'16.7M | Product separated into two |
|  | APEG550Ac | 28.7 |  | 21.25 | phases. |
| 22 | 40HA8000Ac | 22.4 | 1200 | MD65D'7.7M |  |
|  | APEG550Ac | 18.5 |  | 18.5 |  |
|  | Polyether Diluent | 11.9 |  |  |  |
| 23 | 40HA8000Ac | 24.75 | 1300 | MD65D'7.7M |  |
|  | APEG550Ac | 17.35 |  | 17.6 |  |
|  | Polyether Diluent | 11.9 |  |  |  |

TABLE 1-continued

Specifics of Surfactant Syntheses.

| Copolymer Number | Polyether ID | Wt (g) | BAMW (a) | SiH Fluid (wt in g) | Comments |
|---|---|---|---|---|---|
| 24 | 40HA8000Ac | 30.65 | 1600 | MD65D'7.7M | |
| | APEG550Ac | 14.4 | | 15.3 | |
| | Polyether Diluent | 12.1 | | | |
| 25 | 40HA8000Ac | 27.9 | 1450 | MD65D'7.7M | |
| | APEG550Ac | 15.8 | | 16.3 | |
| | Polyether Diluent | 12.0 | | | |
| 26 | 40HA8000Ac | 33.1 | 1750 | MD65D'7.7M | |
| | APEG550Ac | 13.2 | | 14.3 | |
| | Polyether Diluent | 12.2 | | | |
| 27 | 40HA10,000Ac | 118.6 | 1955 | MD65D'7.7M | *Prepared via KOH technology. (Comparative) |
| | APEG550Ac* | 26.3 | | 52.7 | |
| | 40HA1500Ac* | 92.8 | | | |
| | Toluene | 48 | | | |
| 28 | 40HA4,000Ac* | | ~1400 | MD65D'7.7M | Control: similar to #27 with all PE prepared via KOH technology; same number of moles of each polyether. (Comparative) |
| | APEG550Ac* | | | | |
| | 40HA1500Ac* | | | | |
| | Polyether Diluent (20%) | | | | | a) BAMW of the terminally unsaturated polyethers, excluding retained solvents or diluents.
b) Components of polyether blend used in synthesis of surfactant Symbolism; Initial number followed by H indicates nominal percentage of EO residues in a polyether based on EO and PO; letter A indicates polyether is allyl alcohol-started; numbers following capital letter indicate nominal molecular weight of the polyether; letters -Ac, -t-Bu indicate acetoxy and t-butyl capping, respectively; APEG stands for allyl-started, polyethylene glycol. Unless otherwise indicated, APEG-550Ac was produced via KOH process then ion exchanged to remove KOH prior to being acetoxy-capped; all other polyethers were capped as received. "Magn." indicates the polyether was MAGNESOL® treated prior to use. "NaPro" indicates sodium propionate buffer.

The surfactants in Table 1 were evaluated in the polyurethane foam Test Formulation A (Table 2). The procedure for the evaluation is as follows: A 32 oz paper cup was charged with NIAX® polyol 16–56 (250 g), the surfactant to be evaluated ("pphp" refers to parts surfactant per 100 parts polyol), amine/water premix (containing 13.75 g of water and 0.5 g of NIAX® catalyst A-200), and methylene chloride (25 g). A brass mixing baffle with four equally spaced 0.5 inch wide vertical baffles was inserted into the cup, and the mixture was stirred for 15 seconds at 2150 rpm using a drill press with a marine blade. After 20 seconds stannous octoate (0.575 g, 0.46 mL) was added to the reaction mixture. A timer was started and the mixture was stirred for 8 seconds before adding 80/20 TDI (173.6 g) with continuous stirring for an additional seven seconds. The stirrer was then stopped and the reaction mixture was dumped into a pre-weighed five gallon plastic bucket. The cup was kept inverted over the bucket for a total of ten seconds. As the foam began to rise, a small (one inch) square of aluminum foil was placed on its top to support a fixed length wire that floated in a supporting tube calibrated for recording foam heights in inches. The maximum height of the foam at blowoff, the amount of top collapse after one minute, and the rise time were recorded. The foam was placed in an oven at 120° C. for about ten minutes, and then was allowed to cool to room temperature overnight. The height of the foam was measured in cm, then the foam was cut open using a band saw and samples were taken for evaluation. 4"×4"×½" pieces were cut from the center using a bread slicer. For each sample the cell size (commonly referred to as the foam "structure") was assessed and breathability through the foam was determined using a Nopco breathability apparatus (adjusted back pressure to 0.5 inches of water and read air flow in standard cubic feet per minute). Generally speaking, coarse foam structures are undesirable and generally result in very low breathabilities. Extremely coarse, spongy or partially collapsed foams were often not examined for cell size or airflows.

TABLE 2

Polyurethane Foam Test Formulation A

| Material | pphp (wt.) |
|---|---|
| NIAX ® Polyol 16-56 | 100 |
| Distilled water | 5.5 |
| NIAX ® Catalyst A-200 | 0.2 |
| Methylene chloride | 10.0 |
| Stannous octoate | 0.23 |
| TDI | 69.44 |
| Surfactant | varied[a] |

[a]Surfactant samples containing diluent were evaluated such that the contained copolymer was the same as other materials ("pphp" in Tables 3 and 4 refers to contained copolymer).

Table 3 shows a comparison of Copolymer No. 4 against several currently available commercial products and a Control which represents a Copolymer with the same nominal structure as Copolymer 4 except with polyethers generated via conventional KOH technology so that the EO and PO therein are not randomly distributed. Copolymer 4 exhibited clearly higher rise with equal or superior breathability performance. Copolymer 4 continued to exhibit good performance below 0.5 pphp, well below the normal range where prior art commercial materials (usually utilized above 0.7 pphp) have failed. Even as low as 0.3 pphp Copolymer 4 exhibited excellent rise performance (the foam structure began to deteriorate indicating that lower use levels will likely give failure). It can be clearly seen that the present invention gives superior rise performance and shows higher potency than the prior art.

TABLE 3

Competitive Foam Test Results (Formulation A).

| Run | Copolymer ID | pphp | Rise (cm) | % TC | AF | Str | Comments |
|---|---|---|---|---|---|---|---|
| 1 | 4 | 1.25 | 41.2 | 1.7 | 7.0 | M | |
| | Control | 1.25 | 39.8 | 1.2 | 6.3 | NR | |
| | L-620 | 1.25 | 39.3 | 1.8 | 3.6 | NR | |
| | GS-1 | 1.25 | 39.3 | 2.3 | 6.3 | NR | |
| | DC-1 | 1.0 | 39.3 | 2.4 | 5.5 | NR | |
| | L-620 | 0.85 | 38.6 | 3.6 | 4.7 | NR | |
| | GS-1 | 0.85 | 36.8 | 7.3 | 6.6 | NR | |
| 2 | Example 4 | 0.7 | 40.5 | 2.5 | 6.7 | M | |
| | Control | 0.7 | 38.1 | 2.6 | 6.0 | NR | |
| | L-620 | 0.7 | 38.2 | ND | 5.1 | NR | |
| | GS-1 | 0.7 | Collapsed | | | | Failure |
| | DC-1 | 0.6 | 37.1 | 6.7 | 6.0 | NR | |
| 3 | Example 4 | 0.5 | 40.2 | 3.2 | 6.3 | C | |
| | Control | 0.5 | 38.3 | 3.4 | 6.3 | NR | |
| | L-620 | 0.5 | 37.3 | 6.7 | 6.6 | NR | |
| | DC-1 | 0.5 | Collapsed | | | | Failure |
| 4 | Example 4 | 0.4 | 40.1 | 3.1 | 3.3 | C | |
| | Control | 0.4 | 38.0 | 3.4 | 6.8 | NR | |
| | L-620 | 0.4 | 36.3 | 4.1 | 5.5 | NR | Near Failure |
| 5 | Example 4 | 0.3 | 39.6 | 8.6 | 0.9 | C | Still potent. |

NR = Not Reported; ND = Not determined.
% TC = Percent top collapse; AF = breathability (Nopco airflow units).
Str = cell structure; F = Fine, M = Medium, C = Coarse.

The breadth of the present invention is demonstrated by the Copolymers described above as evaluated in Table 4. Copolymers 1–8 demonstrate that proper manipulation of silicone architecture and polyether blend will produce copolymers with outstanding performance with a range of rise and, in many cases, flat breathabilities (a desirable feature). Repeat evaluation of Example 2 several days later gave essentially identical results. Copolymers 9–16 demonstrate polyethers capped with a non-polar moiety such as t-butyl-group are as effective as acetoxy-capped polyethers.

Since MAGNESOL® treatment is frequently used for conventional KOH technology, the impact of this treatment was tested and no advantages were found in the foam performance. Pre-catalysis buffering with sodium propionate also was found not to be necessary to obtain excellent performance.

Copolymer 21 exhibited phase separation presumably due to sluggish reactivity and side reactions. The effects of this problem can be mediated by blending with diluent to achieve a more homogeneous material (note improved rise performance upon dilution). Adding the diluent prior to catalysis insures lower reaction mix viscosity as well as improving solubility of the components in the two-phase reaction mixture. The resulting materials (Copolymers 22–26) were evaluated with the retained diluent and clearly show superior performance. Note with Copolymer 25 the breathability performance is reversed from normal (conventional surfactants usually exhibit decreasing breathability with higher use levels).

Copolymer 27 is an example of a three polyether copolymer employing an intermediate molecular weight polyether (between 1400–3000 daltons). While these three polyether systems generally exhibit less potency than two polyether systems since some of the graft sites on the silicone backbone become occupied by lower molecular weight polyethers, they have found unique utility in some applications. In this case, the intermediate molecular weight polyether was prepared via conventional KOH process (the polyether could have been made via DMC process in which intermediate MWt polyethers may be isolated due to build-factor limitations of the equipment). The foam rise and breathability performance were superior to a Control made with conventional process polyethers (Copolymer 28, a commercial Copolymer made according to U.S. Pat. No. 4,857,583). The use of high molecular weight polyethers made with the DMC catalyst produces copolymers with superior potency and flat breathabilities compared with the Control which has been optimized with the raw materials available from KOH technology.

TABLE 4

Foam Test Results (Formulation A).

| Co-polymer Number | pphp | Rise (cm) | % TC | AF | Str | Comments |
|---|---|---|---|---|---|---|
| 1 | 1.25 | 34.0 | 16.8 | Not Recorded | | Partial Collapse. |
| | 0.7 | 32.0 | 25.5 | Not Recorded | | Partial Collapse. |
| | 0.5 | 28.7 | 1.8 | 7.0 | M | Partial Collapse. |
| 2 | 1.25 | 40.9 | 1.9 | 4.5 | F | Flat Breathability |
| | 0.7 | 39.9 | 3.8 | 5.3 | F | |
| | 0.4 | 39.1 | 1.3 | 4.0 | F | |
| | 1.25 | 39.6 | 1.9 | 4.5 | F | Repeated evaluation. |
| | 0.7 | 39.4 | 3.9 | 5.0 | F | (Same results) |
| | 0.4 | 37.9 | 0.7 | 2.4 | F | |
| 3 | 1.25 | 41.2 | 1.2 | 2.3 | F | Flat Breathability |
| | 0.7 | 40.4 | 3.1 | 2.8 | F | |
| | 0.4 | 39.1 | 5.1 | 1.7 | M | |
| 4 | 1.25 | 41.1 | 1.8 | 7.0 | M | Flat Breathability |
| | 0.7 | 40.6 | 2.5 | 6.8 | M | |
| | 0.5 | 40.4 | 3.1 | 6.3 | M | |
| | 0.4 | 40.1 | 3.7 | 3.3 | M | |
| | 0.3 | 39.6 | 3.8 | 0.9 | C | |
| 5 | 1.25 | 38.4 | 5.7 | 5.3 | C | |
| | 0.7 | 37.6 | 7.0 | 4.5 | C | |
| 6 | 1.25 | 40.4 | 2.5 | 4.0 | M | Flat Breathability |
| | 0.7 | 40.1 | 3.2 | 4.3 | M | |
| 8 | 1.25 | 39.1 | 3.8 | 1.0 | M | |
| | 0.7 | 38.9 | 4.4 | 0.1 | M | |
| | 0.45 | 39.1 | 3.2 | 3.8 | F | |
| 9 | 1.25 | 27.7 | 30.3 | ND | F | Partial collapse. |
| | 0.7 | 28.2 | 28.8 | ND | F | Partial collapse. |
| 10 | 1.25 | 37.6 | 3.5 | 5.5 | F | Flat Breathability. |
| | 0.7 | 37.1 | 4.8 | 5.5 | F | |
| | 0.4 | 36.3 | 6.3 | 5.8 | F | |
| 11 | 1.25 | 35.8 | 6.4 | 5.8 | F | Flat Breathability. |
| | 0.7 | 36.3 | 5.5 | 6.5 | F | |
| | 0.4 | 34.3 | 7.4 | 5.8 | F | |
| 12 | 1.25 | 34.8 | 7.3 | 4.8 | F | Flat Breathability |
| | 0.7 | 35.8 | 6.4 | 6.0 | F | |
| | 0.4 | 36.6 | 4.9 | 6.5 | F | |
| | 0.3 | 33.8 | 10.7 | 6.0 | F | |
| 13 | 1.25 | 39.6 | 2.5 | 6.0 | F | Flat Breathability. |
| | 0.7 | 39.4 | 3.3 | 6.5 | F | |
| | 0.4 | 37.8 | 6.1 | 6.0 | F | |
| 14 | 1.25 | 34.8 | 10.2 | 2.5 | F | Flat Breathability |
| | 0.7 | 34.0 | 12.6 | 2.5 | F | |
| | 0.4 | 32.0 | 16.6 | 2.1 | M | |
| 15 | 1.25 | 39.1 | 3.2 | 4.0 | M | Flat Breathability |
| | 0.7 | 39.1 | 3.2 | 4.5 | M | |
| | 0.4 | 38.1 | 6.0 | 5.0 | M | |
| 16 | 1.25 | 36.6 | 6.3 | 2.2 | M | |
| | 0.7 | 33.0 | 15.2 | 1.8 | M | |
| | 0.4 | 37.1 | 6.7 | 4.0 | M | |
| 21 | 1.25 | 31.0 | 22.3 | 3.0 | M | Top layer |
| | 1.25 | 34.5 | 11.0 | 5.3 | M | Bottom Layer |
| | 1.25 | 34.5 | 11.0 | 1.1 | C | Combined layers blended |
| | 0.7 | 37.6 | 3.5 | 0.4 | C | with 20% polyether |
| | 0.45 | 38.1 | 2.0 | 0.4 | C | diluent and retested. |
| 22 | 1.25 | 38.8 | 2.6 | 4.5 | M | |
| | 0.7 | 38.3 | 4.6 | 1.2 | C | |
| | 0.4 | 37.8 | 4.0 | 0.5 | C | |
| 23 | 1.25 | 39.1 | 2.6 | 4.8 | F | |
| | 0.7 | 39.4 | 3.2 | 3.5 | M | |
| | 0.4 | 38.1 | 5.2 | 1.2 | C | |

TABLE 4-continued

Foam Test Results (Formulation A).

| Co-polymer Number | pphp | Rise (cm) | % TC | AF | Str | Comments |
|---|---|---|---|---|---|---|
| 24 | 1.25 | 40.1 | 1.2 | 3.8 | F | Flat Breathability |
|  | 0.7 | 40.4 | 1.3 | 4.8 | F |  |
|  | 0.4 | 39.1 | 2.6 | 3.5 | F |  |
| 25 | 1.25 | 41.1 | 2.4 | 5.3 | F | Reversed breathability. |
|  | 0.7 | 39.6 | 1.9 | 4.8 | F |  |
|  | 0.4 | 39.4 | 3.9 | 3.5 | F |  |
| 26 | 1.25 | 41.1 | 2.4 | 4.0 | F | Flat Breathability. |
|  | 0.7 | 40.4 | 1.9 | 4.0 | F |  |
|  | 0.4 | 39.1 | 3.9 | 3.3 | F |  |
| 27 | 1.30 | 38.8 | 0.0 | 5 | F | Diluted prior to evaluation. |
|  | 0.5 | 38.1 | 1.7 | 3 | C |  |
|  | 0.4 | 36.6 | 5.7 | 3 | C |  |
|  | 0.3 | 35.6 | 9.0 | 3 | C |  |
| 28* | 1 | 37.1 | 1.1 | 4 | F | Diluted prior to evaluation. |
|  | 0.5 | 35.5 | 4.9 | 9 | F | Non-flat breathability. |
|  | 0.4 | 27.2 | 31.1 | ND | Voids | Partial collapse |

NR = Not Reported; ND = Not determined.
% TC = Percent top collapse; AF = breathability (Nopco air flow units).
Str = cell structure; F = Fine, M = Medium, C = Coarse.
*Control for Example #27 (comparative, not of this invention)

We claim:

1. A process for making polyurethane foam comprising reacting a mixture of (a) a polyether or polyester polyol containing an average of more than two hydroxyl groups per molecule; (b) an organic isocyanate having at least two isocyanate groups per molecule; (c) at least one catalyst; (d) optionally, an auxiliary blowing agent; (e) water; and (f) a surfactant that has the generalized average formula $M''D''_xD''_yM''$ wherein M" represents $(CH_3)_3SiO_{1/2}$ or $R(CH_3)_2SiO_{1/2}$;

D represents $(CH_3)_2SiO_{2/2}$;

D" represents $(CH_3)(R)SiO_{2/2}$;

x is from about 40 to about 220; and y is from about 5 to about 34;

R are polyether-containing substituents obtained from a blend of at least two different polyethers selected from the following two groups:

1) $-C_{n'}H_{2n'}O(C_2H_4O)_{a'}(C_3H_6O)_{b'}R''$ moieties having average molecular masses above 3000 daltons wherein the distribution of $-C_2H_4O-$ and $-C_3H_6O-$ groups is random (or contains a random block), and wherein n' is 3–4;

a' and b' are positive numbers such $0 \leq a'/(a'+b') \leq 0.6$;

R" represents —H, an alkyl group of 1–8 carbon atoms, —C(O)R''', —C(O)OR''' or —C(O)NHR''';

R''' represents mono-functional alkyl or aryl groups; the random block of EO/PO of said polyether having been produced using a double metal cyanide catalyst; and 2) $-C_{n''}H_{2n''}O(C_2H_4O)_{a''}(C_3H_6O)_{b''}R''$ moieties having average molecular masses in the range 300–3000 daltons wherein n" is 3–4;

a" and b" are independently 0 or a positive number such that the total molecular weight of the polyether is 300 to 3000 daltons;

and R" and R''' moieties are as defined above;

wherein of the two different polyethers, at least one is selected from group (1) polyethers and the blend average molecular weight of the polyethers is between 1100 and 3000 daltons.

2. A process according to claim 1 wherein the polyether-containing substituents on said surfactant have blend average molecular weight of 1100–2100.

3. A process according to claim 1 wherein the number of units of D to the number of units of (D"+M") is less than 10:1.

4. A process according to claim 1 wherein x=65–135 and y=7 to 22.

5. A process according to claim 1 wherein the molar ratio of the first group of polyethers to the second group of polyethers is between 0.8 and 2.5.

6. A process according to claim 1 wherein the surfactant contains at least three different R groups.

7. A process according to claim 1 wherein the surfactant additionally comprises a diluent in an amount so that the viscosity of the surfactant is less than 2,000 centistokes at 25° C.

8. A process according to claim 1 wherein the double metal cyanide catalyst is a zinc hexacyanocobaltate catalyst.

9. Polyurethane foam produced by the process of claim 1.

10. Polyurethane foam produced by the process of claim 2.

11. Polyurethane foam produced by the process of claim 3.

12. Polyurethane foam produced by the process of claim 4.

13. Polyurethane foam produced by the process of claim 5.

14. Polyurethane foam produced by the process of claim 6.

15. Polyurethane foam produced by the process of claim 7.

16. Polyurethane foam produced by the process of claim 8.

* * * * *